(No Model.)
F. A. DIXON.
FRUIT JAR.
No. 522,785. Patented July 10, 1894.
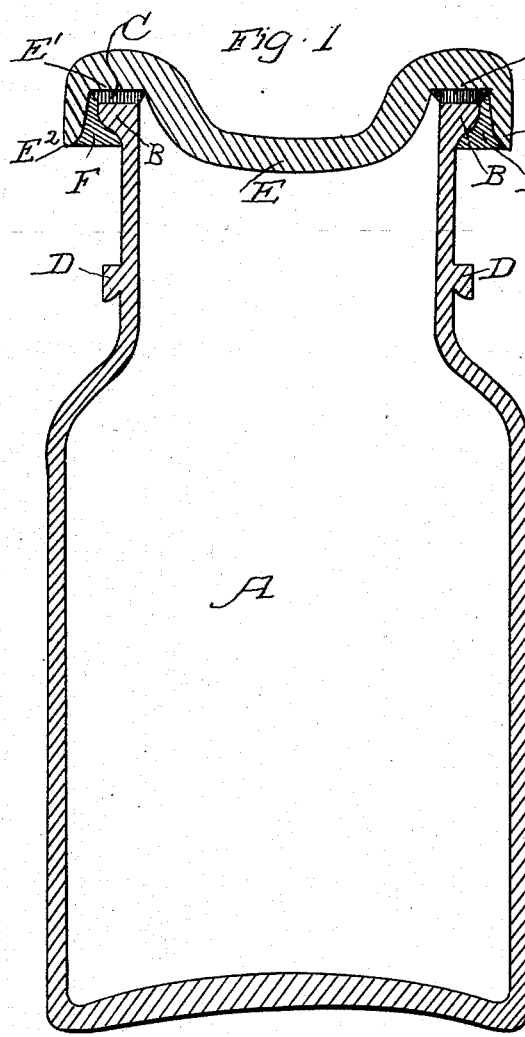
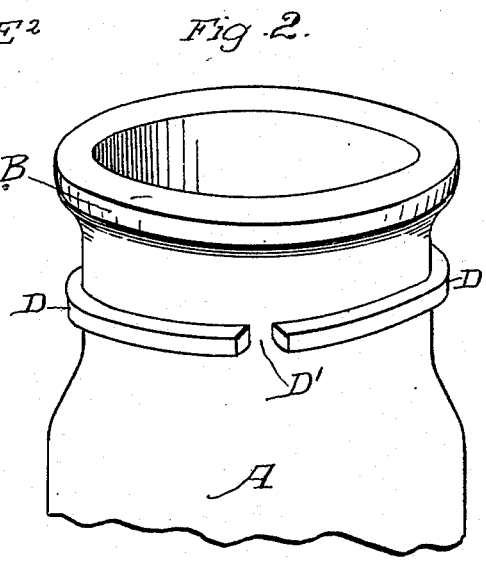
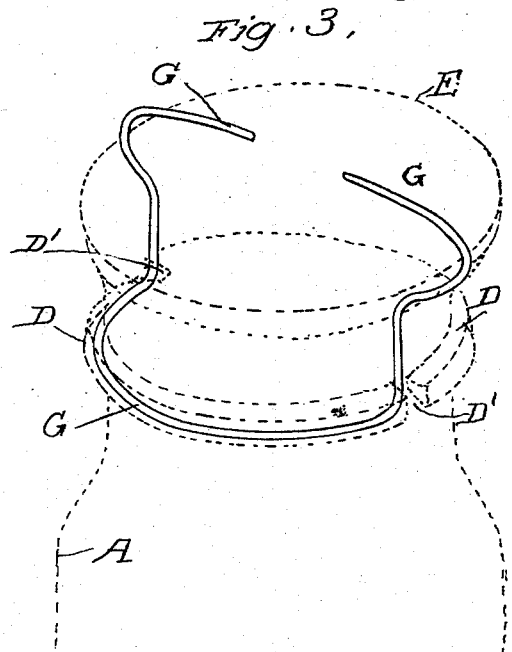
Witnesses
J. H. Mouse
J. A. Bayless
Inventor,
Frank A. Dixon
By Dewey & Co.
Attys

UNITED STATES PATENT OFFICE.

FRANK. A. DIXON, OF SAN JOSÉ, CALIFORNIA.

FRUIT-JAR.

SPECIFICATION forming part of Letters Patent No. 522,785, dated July 10, 1894.

Application filed April 16, 1894. Serial No. 507,750. (No model.)

*To all whom it may concern:*

Be it known that I, FRANK. A. DIXON, a citizen of the United States, residing at San José, Santa Clara county, State of California, have invented an Improvement in Fruit-Jars; and I hereby declare the following to be a full, clear, and exact description of the same.

My invention relates to improvements in fruit jars. It consists in details of construction which will be more fully explained by reference to the accompanying drawings, in which—

Figure 1, is a sectional view of a fruit jar embodying my invention. Fig. 2, is a perspective view of the upper portion of the jar, with the cover omitted. Fig. 3, shows the spring clamp, the jar and cover being shown by dotted lines.

The object of my invention is to provide a means for hermetically sealing glass jars adapted to contain fruit.

A is the body of the jar, the top rim B of which is made thicker than the body of the glass and projects outwardly. The surface of this rim is ground to present a flat face upon which a rubber gasket C is placed to make an air tight joint with the cover, and the jar is molded with a flange or ring D about it at a point a short distance below the top, for a purpose to be hereinafter described. The cover is made with a concavo-convex portion E of sufficiently smaller diameter than the jar so that it will curve downwardly into the jar when the cover is placed upon it. That portion of the cover shown at E' which fits over the top of the jar is made flat and of sufficient diameter to rest upon a rubber gasket C, and when pressed down thereon to make a tight joint around the periphery of the top of the jar. Exterior to this portion which fits upon the top of the jar, the cover is turned downward as shown at $E^2$, forming an annular flange which extends all the way around the top of the jar when the cover is in place, and forms an annular channel between itself and the top of the jar.

When the jar has been filled with fruit and the sirup or liquor in which it is put up, the cover is placed upon the jar, and by reason of the depressed convex portion which enters the jar, the contents will be displaced to such an extent as to raise the liquor and fill any small space that there may be within the jar and exterior to this convex portion, and when the flat portion E' of the cover rests upon the rubber gasket and is pressed down thereon, any small surplus of the liquor being expelled by this pressure, the subsequent cooling of the contents of the jar will, by reason of the vacuum formed, make a perfect joint between the cover and the top of the jar by means of the gasket, and the jar being entirely filled with its liquor or sirup by reason of the displacement caused by the convex inwardly projecting portion E of the cover, no air will be left to commence or cause subsequent fermentation. After the contents are sufficiently cool for the purpose the jar is reversed so as to stand with the cover downward, and this will present the open channel F upwardly, which is formed between the flange $E^2$ of the cover and the top of the jar. The wax by which the jar is to be sealed is now introduced into this channel which is filled with it in a melted condition, and by reason of the heat of the contents of the jar, the wax will be kept soft long enough to settle thoroughly into the channel and hermetically seal it. When the contents are cool, the jar may be reversed, and the sealing will be found perfect without any blow holes caused by the escape of vapor from the interior of the jar.

In order to additionally secure the cover in place, I employ an elastic wire loop or clamp G, the central portion of which is curved so as to fit around the side of the jar below the flange D. Channels D' are made upon opposite sides of this flange or ring, which allow the upwardly turned arms of the clamp to lie in them when the clamp is in place. The semi-circular portion is pressed upon the jar below the flange, the vertical arms, which are bent at right angles from the end of the semi-circle, extend upwardly along the sides of the neck and through the depressions D' in the flange, and are then curved outwardly so as to avoid the projecting edges of the cover and thence are turned inwardly so that the ends will rest upon the top of the cover with an elastic pressure sufficient to maintain it always in contact with the rubber gasket and to compensate for any reduction in thickness which might take place after standing a considerable time.

Having thus described my invention, what

I claim as new, and desire to secure by Letters Patent, is—

1. A fruit jar having a thickened rim projecting outwardly with a ground surface adapted to receive a gasket, and an annular ring or flange around the neck with grooved depressions on opposite sides, in combination with a cover fitting upon the gasket having a rim projecting below the top of the jar so as to form an annular channel for the reception of the sealing wax or material when the jar has been inverted, and an elastic clamp.

2. A fruit jar the upper edge of which is thickened and projects outwardly so as to form a shoulder on the lower side of the rim, and a broad flat surface on the upper side, a cover having a central convex portion, and a broad flat surface on its under side at the base of the convex central portion, adapted to rest upon a gasket on the thickened rim of the jar, said cover having also a downwardly turned flange extending below the shoulder formed on the under side of the rim and forming a channel for the reception of the sealing medium, substantially as herein described.

3. A fruit jar the upper edge of which is thickened and projects outwardly so as to form a shoulder on the lower side of the rim, and a broad flat ground-surface on the upper side, a cover having a central convex portion, and a broad flat surface on its under side at the base of the convex central portion, adapted to rest upon a gasket on the thickened rim of the jar, said cover having also a downwardly turned flange extending below the shoulder formed on the under side of the rim and forming an annular channel for the reception of the sealing medium, and said jar having an annular flange below its rim with grooved depressions on opposite sides, and a clamp for holding the cover in place, consisting of an elastic semi-circular ring adapted to surround the neck of the jar below said annular flange and provided with arms extending upwardly through the depressions and adapted to be bent inward over the cover, substantially as herein described.

In witness whereof I have hereunto set my hand.

FRANK. A. DIXON.

Witnesses:
CHAS. E. EDDY,
THOMAS M. TOPP.